United States Patent [19]

Prieels et al.

[11] Patent Number: 4,667,018

[45] Date of Patent: May 19, 1987

[54] PROCESS FOR THE PURIFICATION OF PROTEINS USING ACIDIC POLYSACCHARIDE GELS

[75] Inventors: Jean-Paul Prieels, Brussels; Robert Peiffer, Ottignies, both of Belgium

[73] Assignee: Oleofins, S.A., Brussels, Belgium

[21] Appl. No.: 826,720

[22] Filed: Feb. 6, 1986

[30] Foreign Application Priority Data

Feb. 7, 1985 [BE] Belgium .............................. 0/214464

[51] Int. Cl.$^4$ ............................................... A23J 1/20
[52] U.S. Cl. .................................... 530/417; 426/656; 426/657; 435/190; 435/192; 530/387; 530/415; 530/421; 530/832; 530/833
[58] Field of Search ............... 530/415, 417, 421, 832, 530/833, 387; 426/656, 657; 435/190, 192

[56] References Cited

U.S. PATENT DOCUMENTS

| | | | |
|---|---|---|---|
| 2,161,861 | 6/1939 | Gerlough | 530/421 X |
| 2,607,768 | 8/1952 | McCready et al. | 530/421 X |
| 3,069,327 | 12/1962 | Eldridge et al. | 530/378 X |
| 3,252,961 | 5/1966 | Rodgers et al. | 530/421 X |
| 3,404,142 | 10/1968 | Shank et al. | 530/421 |
| 3,842,062 | 10/1974 | Eastman | 530/833 X |
| 4,229,342 | 10/1980 | Mirabel | 530/832 X |
| 4,436,658 | 3/1984 | Peyrouset et al. | 530/832 X |

*Primary Examiner*—Howard E. Schain
*Attorney, Agent, or Firm*—John K. Abokhair; M. Norwood Cheairs

[57] ABSTRACT

A process for the purification of proteins from a fluid medium wherein said proteins have an isoelectric pH higher than the pH of said fluid medium, said process comprising passing the liquid medium over acidic polysaccharide gel particles of at least 0.5 mm in the shortest dimension, and recovering the desired proteins from the gel particles by elution with an aqueous salt solution having ions concentration of at least 5 grams per liter.

28 Claims, No Drawings

PROCESS FOR THE PURIFICATION OF PROTEINS USING ACIDIC POLYSACCHARIDE GELS

FIELD OF THE INVENTION

The present invention relates to a process for the purification of proteins, particularly proteins present in milk or milk derivatives, such as milk whey. More particularly, the present invention relates to a process for the purification or extraction of proteins by treating under suitable conditions in the presence of an acidic polysaccharide which can be gelled with metal ions. Still more particularly, the present invention relates to the extraction or purification of proteins, the isoelectric pH of which is greater than 7.5, such as lactoferrin, lactoperoxydase and other analogues, present in milk or milk derivatives.

BACKGROUND OF THE INVENTION

Many applications for proteins such as lactoferrin and lactoperoxydase are known, particularly in the alimentary field and therapeutics.

As a result of an ever-increasing demand for such proteins, there is a need for a single process which can be applied to extract various proteins from various media. Such a process is not presently available.

For example, French Pat. No. 2,505,615 teaches a process for extracting two individual proteins from milk, but this process specifically requires modification of the pH of the milk to be treated. Furthermore, the process described in the patent utilizes powders of inorganic absorbents, such as silica, in the form of macroporous and microscopic beads. This makes it necessary to work in a medium which is free from casein and lipids in order to avoid rapid blocking of the resin.

Processes have also been proposed which utilize ion exchange resins in particles which are less fine than the inorganic powder beads. However, due to their macroporous structure, these resins also have the disadvantage of being rapidly blocked.

The use of titanium oxide beads, the diameter of which can vary between 50 microns and several centimeters, as an absorbing material has also been proposed. However, a material of this type requires the milk and/or the milk whey to be pretreated in order to reduce the ion concentration therein. Otherwise, the proteins cannot be recovered. This pretreatment consequently represents additional operations and a modification of the medium.

Thus, there is a need for a process which can readily extract proteins from a medium as complex as whole milk, which comprises fats, lipid globules and casein micelles, wherein the process is free of the above mentioned disadvantages of blocking, or requiring the medium to be pretreated.

SUMMARY OF THE INVENTION

An object of the present invention is to provide such a process.

Another object of the present invention is to provide a process for the purification of proteins without significantly changing the medium from which the proteins are extracted.

Another object of the present invention is to provide a purification process to extract or recover from milk proteins having an isoelectric point (pH) greater than 7.5.

Applicants have found that the use of acidic polysaccharides, which can be gelled under suitable conditions, permits isolation and purification of various proteins from milk, milk derivatives and the like.

The present invention relates to a process for the purification of proteins from a fluid medium wherein said proteins have an isoelectric pH higher than the pH of said fluid medium, said process comprising passing the liquid medium over acidic polysaccharide gel particles of at least 0.5 mm in the shortest dimension, the content of acidic polysaccharide in the gel being from about 1 to about 8% by weight, and recovering the desired proteins from the gel particles by elution with an aqueous salt solution having ions concentration of at least 5 grams per liter.

DETAILED DESCRIPTION OF THE PREFERRED EMBODIMENTS

Applicants have unexpectedly found that the above mentioned proteins can be purified and isolated when the particles of gelled acidic polysaccharide measure not less than 0.5 mm in their shortest dimension. Particles of less than 0.5 mm in their smallest dimensions are very difficult to manufacture. Moreover, when used in the column, smaller particles apparently collapse, making it difficult for the protein medium (milk) to flow through the beads.

This is all the more unexpected since the previously employed resins needed to have an as large as possible specific surface area, ranging up to 700 $m^2/g$, in order to achieve the extraction of the proteins.

Now, in the process of the invention, the gels produced from the acidic polysaccharides have low protein permeability. Thus, protein absorption is limited. The specific surface area of the gel is normally between 0.002 and 0.2 $m^2/g$.

The acidic polysaccharides employed in the present invention are those capable of forming a gel. Preferably, the gel forming acidic polysaccharides are selected from alginates and carrageenins.

These acidic polysaccharides gel when brought into contact with a solution containing cations, in particular, alkali metal, cations selected from the group consisting of K, Rb and Cs, alkaline-earth metal cations, cations of the iron series and the ammonium cation.

Applicants have also found, unexpectedly, that proteins can be adsorbed on the acidic polysaccharide gel.

Furthermore, it was found that the method of preparing the acidic polysaccharide gel was highly important for the success of the process of the invention.

When the acidic polysaccharide chosen is an alginate, the gel is usually prepared by taking an aqueous solution of a soluble alginate salt, usually the sodium salt, which is then brought into contact with a counter-ion to produce gel formation. A $CaCl_2$ solution is usually employed.

It has been noted, however, that to obtain a gel which can be used in the process of the invention, the alginate or carrageenate concentration in the gel needs to be within well-defined limits, from about 1 to about 8% by weight in the present case, the remainder consisting essentially of water.

When the acidic polysaccharide concentration in the gel is below approximately 1%, gel stability is considerably reduced as a result of the excess water, making it useless for purifying proteins. With a concentration above 8%, on the other hand, a viscosity increase is also observed, which no longer allows the medium to be handled with ease, thus making the gel practically impossible to prepare.

The gel obtained under good conditions can be used in the form of beads, pearls, strips, filaments, fibers or even woven material.

According to an embodiment of the present invention, an aqueous solution of sodium alginate is prepared and the alginate is subsequently precipitated with $CaCl_2$.

The gel, obtained in the required form, is then placed in a $CaCl_2$ solution, so that the gel is always in the presence of the ion which is responsible for gelling.

According to an embodiment of the process of the present invention, the milk or the milk whey treated has a calcium concentration which is sufficient to ensure the stabilization of the alginate gel.

When carrageenin is chosen as the acidic polysaccharide, the gel is usually prepared by forming an aqueous solution of a soluble carrageenin salt. The sodium salt solution is usually subsequently placed in contact with a counter-ion to produce the gel formation. A solution of $KCl$, $NH_4Cl$ or $RbCl$ is generally used.

According to an embodiment of the present invention, an aqueous solution of sodium carrageenate is prepared and is subsequently gelled with KCl.

The gel obtained in the required form is then placed in a KCl solution, so that the gel is always in the presence of the ion responsible for the gelling.

Whatever the acidic polysaccharide used to form the gel, a metal oxide, which is insoluble under the conditions of use, can also be incorporated into the gel. Titanium, zirconium, silicon and aluminium oxides, sepiolite, and their analogues, are examples of suitable oxides which can be incorporated into the acidic polysaccharide gel. The quantity of added oxide usually does not exceed about 3% by weight. Nevertheless, larger quantities can be used, however, without contributing a significant effect.

According to the process of the present invention, the gel thus obtained is used in a solution in which it remains insoluble in a quantity of from about 1 to about 20% by volume relative to the protein solution. This amount of gel used also depends on the concentration of protein to be absorbed.

So far as the proteins which can be separated by the process of the invention are concerned, these generally have an isoelectric pH higher than the pH of the medium. The process of the present invention is more efficient when the difference between the isoelectric pH of the proteins to be recovered and the pH of the medium is at least one (1). Since milk has a pH of about 6, the proteins recovered therefrom have an isoelectric pH of at least 7.5. Examples of milk proteins which can be isolated and purified by the process of the invention include lactoferrin, lactoperoxydase, certain immunoglobulins, and similar other proteins. The proteins which are adsorbed on the acidic polysaccharide gel are then recovered.

It is obvious that the process of the present invention can also be applied to isolate other proteins from other media, using conditions which can be determined by one skilled in the art.

In the case where an alginate gel is used, the proteins adsorbed on the gel in this manner can be eluted with $CaCl_2$ when the gel is a calcium alginate, or with a mixture of ions containing $CaCl_2$ in sufficient quantities.

In the case where a carrageenin gel is employed, the proteins thus adsorbed on this gel can be eluted with the use of an aqueous solution of any water-soluble organic or inorganic salt. However, when the gel is a K or $NH_4$ carrageeniate, it is preferred to use KCl or $NH_4Cl$ in sufficient quantities.

The salt concentration in the solution used to elute the proteins from the alginate gel is not critical. This concentration depends on the salt employed, on the proteins and on the pH of the solution. For example, when $CaCl_2$ are used, a concentration of at least 10 g/l is employed.

The salt used to elute the protein from the gel can, but need not, be the same as that used to adsorb it. It is obvious that, when two different salts are used, they must be compatible, that is to say they must not react to form a precipitate themselves.

Usually, before a new elution recommences, the receptacle and the gel are washed with a salt solution the concentration of which is sufficient to keep the gel stabilized. In most cases, a salt solution with a concentration of 10 g/l is used.

The process of the present invention for isolating and purifying proteins can be carried out continuously or noncontinuously.

According to an embodiment of the process of the present invention in a noncontinuous form, the calcium alginate gel or the potassium carrageenate gel is prepared and is introduced with the protein solution into a vessel to be followed by stirring for a period of from about 10 minutes to about 24 hours, depending on the percentage extraction required, the concentration of the protein to be extracted, and the concentration and the nature of the contaminant materials. The gel is washed with an appropriate salt solution having a concentration of at least 10 g/l, the alginate gel is then eluted with an appropriate salt ($CaCl_2$ or KCl) solution having a concentration above 10 g/l, and the protein is thus recovered as a solution.

According to an embodiment of the process of the invention in a continuous form, the gel is prepared and is preferably introduced into a column reactor operated in a fixed bed or a fluidized bed mode, and the charge is passed through at an LHSV of from about 0.1 to about 3.

The gel is washed with an appropriate salt solution having a concentration of at least 0.1% wt/vol. The alginate gel is then eluted with an appropriate salt solution having a concentration above 0.1 wt/vol and the protein is thus recovered as a solution.

The following examples are given in order to better illustrate the process of the present invention, but without limiting its scope thereby.

EXAMPLE 1

An alginate gel was prepared in the form of filaments approximately 5 cm in length and approximately 1 mm in diameter as the shortest dimension, by extruding a homogeneous aqueous solution containing 30 g/l of sodium alginate and 20 g/l of titanium oxide into an aqueous solution containing 30 g/l of $CaCl_2$.

Separately, sweet unpasteurized milk whey was prepared by slow coagulation of fresh milk at 32° C. in the presence of 0.03 vol. % of rennet with a strength of 7000. This milk whey had a pH of 6.6 at 20° C. and contained 4% lactose, 0.35% lipids and 0.7% proteins (including 0.001% lactoperoxydase and 0.003% lactoferrin).

After addition of 200 g of alginate gel to 5 l of milk whey, the mixture was stirred for 18 h at 4° C. The gel was separated off by filtration through a metal sieve and was then washed three times, each time with 5 l of an aqueous solution containing 3 g/l of $CaCl_2$.

The substances fixed by the gel were recovered by washing the gel twice in 1 l of an aqueous solution containing 50 g/l of $CaCl_2$, with stirring for 2 h at 4° C.

The 2 l of solution obtained in this manner contain approximately 250 mg of proteins, including 130 mg of lactoferrin and 20 mg of lactoperoxydase.

EXAMPLE 2

An aqueous solution containing 30 g/l of alginate was prepared.

3 liters of this solution were sprayed into a solution containing 30 g/l of $CaCl_2$, thus producing calcium alginate gel pearls with a mean diameter of approximately 1.2 mm. The specific surface of this absorbent material was $2 \cdot 10^{-3}$ $m^2/g$.

200 ml of pearls were placed in a column 5 cm in diameter, to form a bed of gel approximately 11 cm in height.

13 volumes of milk were treated, that is 2.575 l of whole milk containing approximately 5% lactose, 4% lipids, 0.9% salt and 3.3% proteins, including approximately 0.008% lactoferrin and 0.003% lactoperoxydase.

The LHSV at which the milk was passed through the gel column was 1.5.

After the milk was passed through, the gel was transferred to a receptacle where it was washed 5 times in succession with a 300 ml volume of an aqueous solution containing 3 g/l of $CaCl_2$. The gel was separated off by decantation and filtration on a nylon filter each time.

The proteins adsorbed on the gel were recovered by washing the gel twice in 300 ml of an aqueous solution containing 3% of $CaCl_2$. With stirring for 2 h at 4° C.

The 600 ml of solution obtained in this manner contained approximately 260 mg of proteins, including 31 mg of lactoperoxydase and 125 mg of lactoferrin. The extraction yield was 72%.

For comparison, the same column was filled with an agar resin crosslinked with polyacrylamide, this resin being usually employed for isolating proteins.

The whole milk whose composition is described above was passed through this resin under the same operating conditions and after less than 1 hour's operation the column was completely blocked.

EXAMPLE 3

An alginate gel was prepared in the form of filaments approximately 10 cm in length and approximately 1.5 mm in diameter as the shortest dimension, by extruding a homogeneous aqueous solution containing 30 g/l of sodium alginate and 5 g/l of titanium oxide into an aqueous solution containing 30 g/l of $CaCl_2$.

The whole milk whose composition is given in Example 2 containing, in particular, 3.3% proteins, including 0.008% lactoferrin and 0.003% lactoperoxydase, was treated.

After addition of 100 g of alginate to 20 l of whole milk, the mixture was stirred for 8 h at 10° C. The gel was separated off by filtration through a metal sieve and was then washed three times with 500 ml of a solution containing 1 g/l of $CaCl_2$.

The 600 ml of solution thus obtained contained approximately 3 g of proteins including 1 g of lactoferrin and 125 mg of lactoperoxydase, together with approximately 0.5 g of fatty substance.

What is claimed is:

1. A process for the recovery of milk proteins have an from a fluid medium wherein said proteins have an isoelectric pH higher than the pH of said fluid medium, said process comprising the steps of:
   (a) passing the liquid medium over gel particles of an acidic polysaccharide under cationic conditions to keep the gel particles insoluble, said particles measuring not less than 0.5 mm in their shortest dimension and wherein the content of acidic polysaccharide in the gel is from about 1 to about 8% by weight; and
   (b) eluting the proteins from the gel particles.

2. The process of claim 1, wherein the fluid medium is selected from the group consisting of milk and milk derivatives and wherein the recovered proteins are proteins having an isoelectric pH of at least 7.5.

3. The process of claim 1, wherein the acidic polysaccharide is selected from the group consisting of alginates and carrageenins.

4. The process of claim 1, wherein the gel particles are formed by contacting an aqueous solution of the polysaccharide salt with a cation selected from the group consisting of a suitable alkali metal, alkaline-earth metal, iron, ammonium and any combination thereof.

5. The process of claim 1, wherein the gel particles have a specific surface area of from about $2 \times 10^{-3}$ to about 0.2 $m^2/g$.

6. The process of claim 1, wherein the amount of gel particles utilized is from about 1% to about 20% by weight based on the fluid medium.

7. The process of claim 1, wherein the gel particles contain not more than 3% by weight of a metal oxide wherein the metal oxide is insoluble under process conditions.

8. The process of claim 7, wherein the metal oxide is selected from the group consisting of titanium, zirconium, silicon and aluminum oxides, sepiolite and any combination thereof.

9. The process of claim 2, wherein the proteins comprise lactoferrin, lactoperoxydase and immunoglobulins.

10. A process for the purification of proteins from a fluid medium wherein said proteins have an isoelectric pH higher than the pH of said fluid medium, said process comprising:
    (a) passing the liquid medium over acidic polysaccharide gel particles of at least 0.5 mm in the shortest dimension; and
    (b) recovering the desired proteins from the gel particles by elution with an aqueous salt solution having ions concentration of at least 5 grams per liter.

11. The process of claim 10, wherein the fluid medium is selected from the group consisting of milk and milk derivatives and wherein the recovered proteins are proteins having an isoelectric pH of at least 7.5.

12. The process of claim 10, wherein the gel particiles contain from about 1 to about 8 wt. % of acidic polysaccharide.

13. The process of claim 12, wherein the acidic polysaccharide is selected from the group consisting of alginates and carrageenins.

14. The process of claim 10, wherein the gel particles are formed by contacting an aqueous solution of the polysaccharide salt with a cation selected from the group consisting of a suitable alkali metal, alkaline-earth metal, iron, ammonium and any combination thereof.

15. The process of claim 10, wherein the gel particles have a specific surface area of from about $2 \times 10^{-3}$ to about 0.2 m$^2$/g.

16. The process of claim 12, wherein the amount of gel particles utilized is from about 1% to about 20% by weight based on the fluid medium.

17. The process of claim 10, wherein the gel particles contain not more than 3% by weight of a metal oxide wherein the metal oxide is insoluble under process conditions.

18. The process of claim 17, wherein the metal oxide is selected from the group consisting of titanium, zirconium, silicon and aluminum oxides, sepiolite and any combination thereof.

19. The process of claim 11, wherein the proteins comprise lactoferrin, lactoperoxydase and immunoglobulins.

20. A process for recovering proteins having an isoelectric pH of at least 7.5 from milk and milk derivatives, comprising the steps of:
(a) passing the milk over gel particles of at least 0.5 mm in the shortest dimension and containing acidic polysaccharide to retain proteins found in the milk; and
(b) eluting the proteins from the gel particles with a salt solution having a salt concentration of at least 5 g/l.

21. The process of claim 20, wherein the acidic polysaccharide is selected from the group consisting of alginates and carrageenins.

22. The process of claim 21, wherein the gel particles are formed by contacting an aqueous solution of the acidic polysaccharide with a cation selected from the group consisting of alkali metal, alkaline-earth metal, iron, ammonium and any combination thereof.

23. The process of claim 20, wherein the gel particles have a specific surface area of from about $2 \times 10^{-3}$ to about 0.2 m$^2$/g.

24. The process of claim 20, wherein the amount of gel particles utilized is from about 1% to about 20% by weight based on the fluid medium.

25. The process of claim 20, wherein the gel particles contain not more than 3% by weight of a metal oxide wherein the metal oxide is insoluble under process conditions.

26. The process of claim 25, wherein the metal oxide is selected from the group consisting of titanium, zirconium, silicon and aluminum oxides, sepiolite and any combination thereof.

27. The process of claim 20, wherein the proteins comprise lactoferrin, lactoperoxydase and immunoglobulins.

28. The process of claim 20 carried out in batch or under continuous conditions.

* * * * *

UNITED STATES PATENT AND TRADEMARK OFFICE
CERTIFICATE OF CORRECTION

PATENT NO. : 4,667,018

DATED : May 19, 1987

INVENTOR(S) : Jean-Paul Prieels and Robert Peiffer

It is certified that error appears in the above-identified patent and that said Letters Patent is hereby corrected as shown below:

On the title page, Item [73] : the assignee should read --OLEOFINA, S.A.--.

Signed and Sealed this

Twenty-second Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,667,018
DATED : May 19, 1987
INVENTOR(S) : Jean-Paul Prieels & Robert Peiffer It is certified that error appears in the above—identified patent and that said Letters Patent is hereby corrected as shown below:

In the specification:

Line 49, column 4, change the value to: "0.1 % wt/vol.".

Line 38, column 5, change to: "$CaCl_2$, with stirring for 2 h at $4^0C$." Change the period to a comma, and the capital "W" to a lower case "w".

In column 5, there is a discrepancy between figures at lines 65 and 67; the correct figure is 300ml at line 65.

In Claim 22, insert the words "a suitable" before "alkali metal".

In Claim 1, line 1, delete "have an".

Signed and Sealed this
Sixth Day of February, 1990

*Attest:*

JEFFREY M. SAMUELS

*Attesting Officer*     *Acting Commissioner of Patents and Trademarks*